April 13, 1937.  W. P. RADER ET AL  2,077,184
FISHLINE FLOAT
Filed Oct. 25, 1935
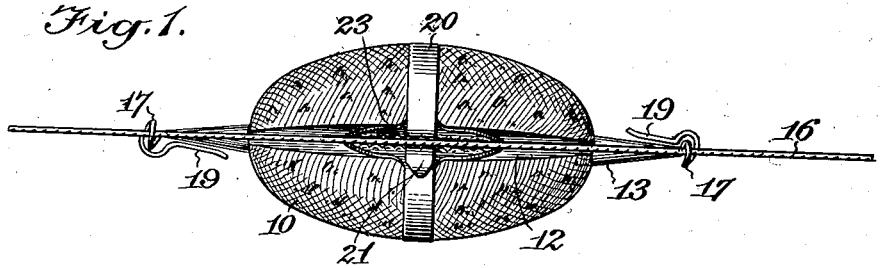
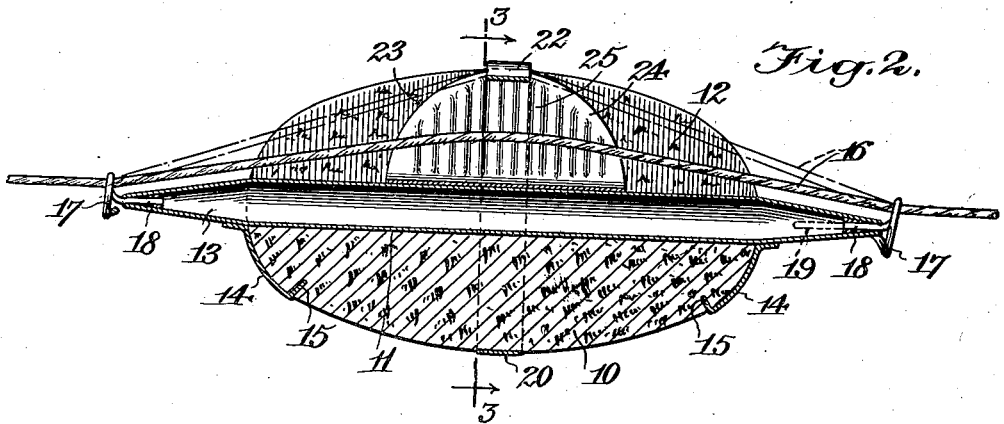
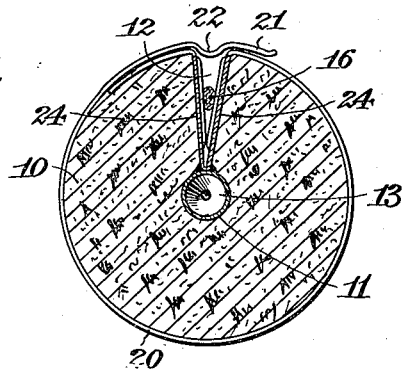
WITNESSES
INVENTORS
WILLIAM P. RADER
and Jesus Cisneros.
ATTORNEYS.

Patented Apr. 13, 1937

2,077,184

UNITED STATES PATENT OFFICE 2,077,184

FISHLINE FLOAT

William P. Rader and Jesús Cisneros, Robstown, Tex., assignors of one-third to Hermenegildo P. Gonzales, Robstown, Tex.

Application October 25, 1935, Serial No. 46,798

6 Claims. (Cl. 43—49)

This invention relates to a float or bobber applicable to a line of fishing tackle or gear.

Among the objects and advantages of the invention are the following. A float or bobber of the indicated character will be self-adjustable on the fishing line by the mere act of the usual casting of the tackle or gear into the water, and so that after the tackle or gear is withdrawn from the water, the float or bobber may be positively held or retained in the adjusted position on the line, according to the depth of the water in which the user intends to carry on fishing operations. The float or bobber may be readily applied, for use in conjunction with the line of various fishing tackle or gear, or removed from the line to enable a fisherman to fish without a float or bobber if desired.

The invention resides in the provision, construction, and functions of the parts described in the following specification, defined as to scope in the appended claims, and as illustrated in the accompanying drawing, in which—

Figure 1 is a view of a float embodying the features of the invention applied to a fishing line, and illustrating the disposition of the parts preparatory to the initial casting of the tackle into the water;

Figure 2 is an enlarged longitudinal sectional view of the float, illustrating the manner in which the line is positively held or retained in the adjusted position on the line, a portion of the line being shown in dot and dash lines as disposed preparatory to the initial casting.

Figure 3 is a transverse section taken on the line 3—3 of Figure 2 looking in the direction indicated by the arrows.

Referring now more particularly to the drawing, it will be apparent that there is shown a float or bobber consisting of a floatable or buoyant body 10. This body will be of suitable size and shape, the same being ovoidal in the present instance. The body 10 is made of suitable floatable or buoyant material such as cork. The body 10 has a central bore 11 extending longitudinally therethrough, and a radial longitudinal slot 12 opening through one side thereof and communicating with said bore 11. The walls of the slot 12 diverge inwardly for a purpose to appear hereinafter. A metal tube 13 fits in the bore 11 and its opposite ends are pointed and project from the opposite ends of the body 10. The tube 13 is secured in place by metal talons or claws 14 on the tube which are impaled in the body 10, as at 15. Means are provided on the opposite ends of the tube 13 to receive a fishing line 16 disposed lengthwise of the body 10. Said means consist of split guides or loops or eyes 17 made of wire, one end 18 of which is secured in the tube end, and the other end 19 of the wire being disposed adjacent the tube end to serve as a spring keeper, to prevent unintentional release or separation of the line 16.

In accordance with another feature of the invention, a split element made of metal is positioned on the body 10 midway between the ends thereof. This element consists of a strip or band ring portion 20 which encircles the body 10 and is disposed in a groove in the body. One end 21 of the strip is disposed crosswise over the mouth of the slot 12, and has a crimp 22 therein. The end 21 constitutes resilient means to be engaged by the line 16 while extending through the guides 17 and being of such character that the line 16 may slip with respect to the body 10 by the pull of the sinker and hook of the tackle, while the float is in the water, and which retains the float in adjusted position on the line when the tackle is withdrawn from the water. The encircling element also embodies a V-shape portion 23 which provides clamping jaws 24 of semi-circular shape and each of said jaws is corrugated as at 25. The portion 23 is soldered or otherwise secured to the tube 13. The portion 23 is disposed in the slot 12 so that the jaws 24 will lie against the inwardly converging walls of the slot with the corrugations 25 extending radially with respect to the longitudinal axis of the body 10. The jaws 24 cooperate to grip the line 16 when brought into the slot 12, to positively hold or retain the float in the adjusted position into which it has been brought in the initial casting aforesaid.

The float or bobber is used in the manner as follows. The fishing line of suitable tackle including a sinker and hook is engaged in the guides 17 through and by virtue of the keepers 19 and said line is also engaged in the crimp 22. The tackle is then cast into the water. The float will be buoyed by the water and the weight of the sinker pulls the line through the guides 17 until the sinker hits the bottom. The float will be tipped indicating that the sinker has reached the bottom. As the tackle is withdrawn from the water the float remains in an adjusted position on the line due to the frictional contact between the line and the means 21 caused by the offset portion of the line indicated in dot and dash lines in Figure 2. The adjustment of the float will be according to the depth of the water in which the fisherman intends to carry on fishing operations. The float is then made firm, or is positively held in the adjusted position by slipping the line under the end 21 into the slot 12. The line is grasped above and below the float and is jerked with the hands thereby forcing the line between the jaws 24 to be effectually gripped thereby. In this manner, the float will be secured on the line.

It will be obvious that the float indicates properly the depth at which to fish; that the line length in the water can be changed at will; that the float can be quickly and easily removed entirely from the line; and that the parts may be economically produced and assembled.

We claim:

1. A float for fishing tackle comprising a buoyant body having a radial longitudinal slot opening through one side thereof and having inwardly converging walls, line guides positioned on the opposite ends of said body respectively through which a line may extend and in which the line may freely move, and resilient means on said body to be engaged by said line, but which allows the line to slip with respect to the float by the pull of the sinker and hook on the line while the float is in the water, and which retains the float in adjusted position on the line when the tackle is withdrawn from the water, said converging walls being engageable with the line to positively hold the float in the adjusted position on the line.

2. A float for fishing tackle comprising a buoyant body having a radial longitudinal slot opening through one side thereof and having inwardly converging walls, line guides positioned on the opposite ends of said body respectively through which a line may extend and in which the line may freely move, and a split ring seated on said body and having resilient means to be engaged by said line, but which allows the line to slip with respect to the float by the pull of the sinker and hook on the line while the float is in the water, and which retains the float in adjusted position on the line when the tackle is withdrawn from the water, said converging walls being engageable with the line to positively hold the float in the adjusted position on the line, said ring enabling the engagement of said walls with the line.

3. A fishing line float comprising a buoyant body having a radial longitudinal slot opening through one side thereof, a metal element positioned on said body, the walls of said slot being inwardly converging, and a clamp embodied by said element and projecting into said slot for the purpose of gripping a fishing line to retain the float in position thereon.

4. A fishing line float comprising a buoyant body having a radial longitudinal slot opening through one side thereof, a metal element positioned on said body, the walls of said slot being inwardly converging, a clamp embodied by said element and projecting into said slot for the purpose of gripping a fishing line to retain the float in position thereon, and eyes positioned on the opposite ends of said body respectively through which said line may extend while being gripped by said clamp.

5. A fishing line float comprising a floatable body, a rigid member extending through said body centrally thereof, the opposite ends of said member having line guides, said body having a longitudinal slot therein opening through one side thereof, means on the body intermediate the ends thereof which may be frictionally engaged by a fishing line passing through said guides to retain the float on the line in various positions of adjustment.

6. A fishing line float comprising a buoyant body, line guides on said body, and a metal element positioned on the body between said guides, said element embodying resilient means to frictionally engage a fishing line passing through said guides, whereby the float will be self-adjustable on the line by the mere act of casting, and said element having provision for clamping the line to positively retain the float in the adjusted position on the line.

WILLIAM P. RADER.
JESÚS CISNEROS.